(12) United States Patent
Riley et al.

(10) Patent No.: US 6,505,890 B2
(45) Date of Patent: Jan. 14, 2003

(54) AIRCRAFT SEAT STRUCTURE

(75) Inventors: Michael C. Riley, Gilbert, AZ (US); Willard F. Hagan, Phoenix, AZ (US)

(73) Assignee: Am-Safe, Inc., Phoenix, AZ (US)

( * ) Notice: Subject to any disclaimer, the term of this patent is extended or adjusted under 35 U.S.C. 154(b) by 0 days.

(21) Appl. No.: 09/778,498

(22) Filed: Feb. 7, 2001

(65) Prior Publication Data

US 2002/0105219 A1 Aug. 8, 2002

(51) Int. Cl.[7] .......................... B60N 2/42; B60R 21/22; B60R 21/26; B60R 21/36
(52) U.S. Cl. ................. 297/452.2; 297/216.1; 297/216.15; 297/216.16; 297/452.18; 297/452.19; 280/728.1; 280/730.1; 280/735
(58) Field of Search .................. 297/216.1, 216.15, 297/216.16, 452.2, 452.18, 452.19; 280/728.1, 730.1, 735

(56) References Cited

U.S. PATENT DOCUMENTS

| | | | | |
|---|---|---|---|---|
| 4,099,780 A | * | 7/1978 | Schmidhuber | 297/411.26 |
| 5,152,578 A | * | 10/1992 | Kiguchi | 297/216.16 |
| 5,282,665 A | * | 2/1994 | Beroth | 297/216.1 |
| 5,553,923 A | * | 9/1996 | Bilezikjian | 297/452.2 |
| 5,564,736 A | * | 10/1996 | Kim | 297/216.1 X |
| 5,575,532 A | * | 11/1996 | Von Rolbicki et al. | 297/452.2 |
| 5,636,901 A | * | 6/1997 | Grilliot et al. | 297/216.1 X |
| 5,791,597 A | * | 8/1998 | Knoll | 297/216.1 X |
| 5,829,827 A | * | 11/1998 | Schaper et al. | 297/216.1 |
| 5,967,603 A | * | 10/1999 | Genders et al. | 297/216.1 X |
| 5,984,350 A | * | 11/1999 | Hagan et al. | 297/735 |

* cited by examiner

Primary Examiner—Peter M. Cuomo
Assistant Examiner—Rodney B. White
(74) Attorney, Agent, or Firm—Richard A. Speer; Mayer, Brown, Rowe & Maw

(57) ABSTRACT

A passive restraint system in an aircraft utilizing a seat structure of the aircraft to store a source of pressurized gas or solid fuel necessary to expand the passive restraint is disclosed. The seat structure of the aircraft comprises multiple hollow tubes, and these hollow tubes can be utilized to either store pressurized gas or solid fuel directly, or to house a vessel that stores pressurized gas or solid fuel. Thus, no additional aircraft seat space is required to house a pressurized gas vessel. By using the existing seat structure to house the source of pressurized gas or solid fuel, significant space and weight savings can be realized, both of which are important factors in aircraft seat design.

11 Claims, 2 Drawing Sheets

AIRCRAFT SEAT STRUCTURE

BACKGROUND

1. Field of the Invention

The present invention relates generally to aircraft seat structures and more specifically to aircraft seat structures used in conjunction with airbag restraint systems.

2. Description of Related Art

Passenger safety systems heretofore found in vehicles such as automobiles and aircraft have been of two principal types, specifically, seat belts and airbags. Possibly the earliest to be used was the passenger lap belt which was attached to fixed sub-structure at each end and was joined over the users lap by suitable buckling devices. Normally one of the two pieces making up the belt was of fixed length while the length of the other piece could be adjusted in order that the belt could accommodate users of all sizes. This type of belt was used for many years in automobiles and remains to this day the principal type of safety restraint used for passenger restraint in private and commercial aircraft.

To further protect against possible injury, the lap-belts in automobiles were modified to include a shoulder strap that was attached at a third fixed point to restrain the passenger's upper torso against forward movement in a crash event. More recently, in the case of passenger automobiles, passive restraints, or airbags, have been utilized to protect against injury in the event of a crash. These bags, which are inflated by compressed air or other gases, are mounted in the automobile steering column and in other fixed locations within the automobile, such as the dash board and side panels. In the event of sudden deceleration of the automobile, as in a crash, sensors identify the event and the compressed air or other gas are released to expand the bags at high speeds directly toward the passengers to prevent their forward movement. Airbags have proven generally effective in providing passenger protection, especially when used in conjunction with safety belt restraints.

Even more recent has been the idea of utilizing passive restraints, or airbags, in aircrafts to protect passengers in e event of a crash. Such passive restraints are disclosed in U.S. Pat. No. 5,984,350, which is assigned to the same Assignee as the present application, and the disclosure of which is incorporated herein by reference. The aircraft passive restraint includes a safety belt that includes first and second lengths that are each fixed at one end to the aircraft seat structure and are connectable one to the other at the other end at a location over a user's lap. The fixed portion of the belt contains: (i) a deployable airbag; (ii) a torsion element which positions or orients the belt so that the bag is deployed away from the user; (iii) a gas conducting tube that directs gas from a gas source to the gas bag; and (iv) an outer, protective cover assembly that is rupturable at least in the area adjacent to the gas bag to permit its expansion.

The system further includes a source of gas, control and firing circuitry including electronics for identifying a crash event. The power source of the system can be either: (a) a dedicated source of battery supplied electricity which is independent of the vehicle electrical power source; or (b) a dedicated vehicle power source. A switch mechanism is included in the belt buckle and in the belt tang that permits system activation when the two belt lengths are oriented correctly and joined with the airbag positioned for expansion away from the users body.

In previous uses of passive restraint systems in aircraft, a separate compartment under the seat structure was required to house the source of gas. This additional compartment added weight to the aircraft and eliminated space below the seat normally used for passenger storage of luggage.

SUMMARY

In the present invention, a passive restraint system in an aircraft utilizes the seat structure of the aircraft to store the source of pressurized gas or solid fuel necessary to expand the passive restraint. The seat structure of the aircraft comprises multiple hollow tubes, and these hollow tubes can be utilized to either store pressurized gas or solid fuel directly, or to house a pressurized gas vessel that stores pressurized gas or solid fuel. Thus, no additional aircraft seat space, beyond the already existing seat structure, is required to house a pressurized gas vessel. By using the existing seat structure to house the source of pressurized gas or solid fuel, significant space and weight savings can be realized, both of which are important factors in aircraft seat design.

Current aircraft seat tubes can be used in accordance with the present invention to house a pressurized gas vessel, or the aircraft seat tube can be modified to store the pressurized gas by incorporating different diameter tubes, tube wall thickness, tube material, and tube manufacturing methods depending on the pressures required in the source of pressurized gas. The ignition device and gas exit port used in the passive restraint system can be made integral to the seat tube through the placement of a header section that holds the ignition device, gas pressure release membrane, gas flow control device, gas exit port, and connection to gas conducting tube.

These and other features and advantages of the invention will be apparent upon consideration of the following detailed description of the presently preferred embodiments of the invention, taken in conjunction with the claims and appended drawings, as well as will be learned through the practice of the invention.

DESCRIPTION OF THE PREFERRED EMBODIMENTS

A description of a passive restraint system for use in aircraft is contained in U.S. Pat. No. 5,984,350, which is assigned to the same Assignee as the present application, and the disclosure of which is incorporated herein by reference. Reference will now be made in detail to preferred embodiments of the invention, examples of which are illustrated in the accompanying drawings.

Figure 1:
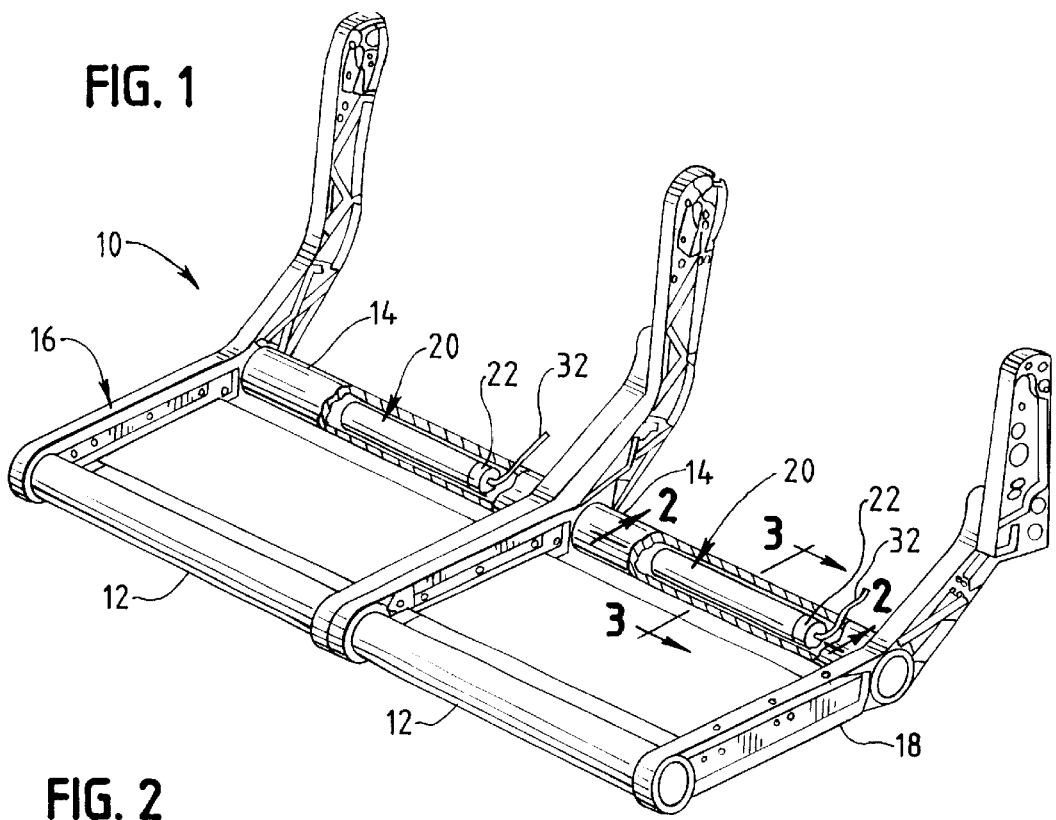
FIG. 1 is a general schematic of an aircraft seat structure incorporating an existing hollow tube housing a pressurized gas generator vessel in accordance with an embodiment of the present invention.

Referring now to FIG. 1, an existing aircraft seat assembly 10 having a front hollow tube 12 and a rear hollow tube 14 connected between two side structures 16 and 18 is shown. According to a preferred embodiment of the present invention, the rear hollow tube 14 of the seat structure 10 contains a pressurized gas generator vessel 20. The rear hollow tube 14 also contains an ignition and gas release device 22 connected to the pressurized gas generator vessel 20.

Figure 2:
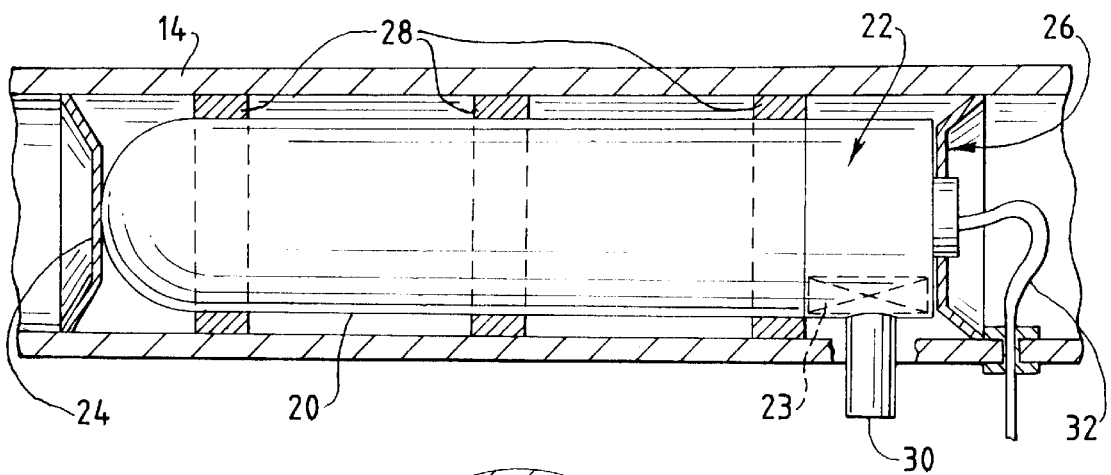
FIG. 2 is a cross-sectional view of a hollow seat tube from an aircraft seat structure containing a pressurized gas generator vessel in accordance with an embodiment of the present invention.
Figure 3:
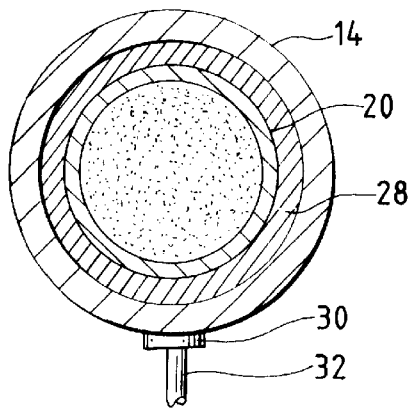
FIG. 3 is a cross-sectional view of a hollow seat tube from an aircraft seat structure containing a gas generator device vessel in accordance with an embodiment of the present invention.

FIGS. 2 and 3 each show a cross-section of the rear hollow tube 14 containing the pressurized gas generator vessel 20 and the ignition and gas release device 22, as shown in FIG. 1, in greater detail. Within the rear hollow tube 14 are two retainers 24 and 26 that hold the pressurized gas generator vessel 20 within the rear hollow tube 14. Furthermore, vibration isolators 28 are placed between the rear hollow tube 14 and the pressurized gas generator vessel 20. The ignition and gas release device 22 is attached to the pressurized gas generator vessel 20. A gas flow control device 23 and a gas exit port 30 are attached to the ignition and gas release device 22 to transport gas in a controlled manner from the pressurized gas generator vessel 20 to the airbag (not shown) via a gas conducting tube for inflation of the airbag in the event of a sudden deceleration. An electrical conductor 32 connects the ignition and gas release device 22 to control and firing system circuitry (not shown). For a more detailed description of the operation and construction of the ignition and gas release device 22, the ignition system, and the airbag, please refer to U.S. Pat. No. 5,984,350, as referenced above.

In constructing the hollow rear tube 14 tube and pressurized gas generator vessel 20 combination shown in FIG. 2, an existing hollow tube of a seat structure can be used, and limited re-engineering of the seat structure is required, except for exit holes for the gas exit port 30 and electrical conductor 32. The retainers 24 and 26 and vibration isolators 28 are used to install and attach the pressurized gas generation vessel 20 inside the rear hollow tube 14. The gas flow control device 23 and gas exit port 30 are attached to the ignition system and gas release device 22 after the device has been installed within the rear hollow tube 14.

In an alternate embodiment, a hybrid system containing compressed gas and solid propellant is utilized to inflate the airbag rather than a pressurized gas alone, as is further described below with respect to FIGS. 1–3. The types of hybrid systems that can be used in this embodiment are well known in the art. In this alternate embodiment, a hybrid system 20 would be contained as shown. The ignition and gas release device 22 ignites a small pyrotechnic charge which heats the gas mixture contained in the pressurized gas generator vessel 20. As the gas is heated, it is then transported through the gas flow control device 23 and the gas exit port 30 to the airbag (not shown) via a gas conducting tube to inflate the airbag.

Figure 4:
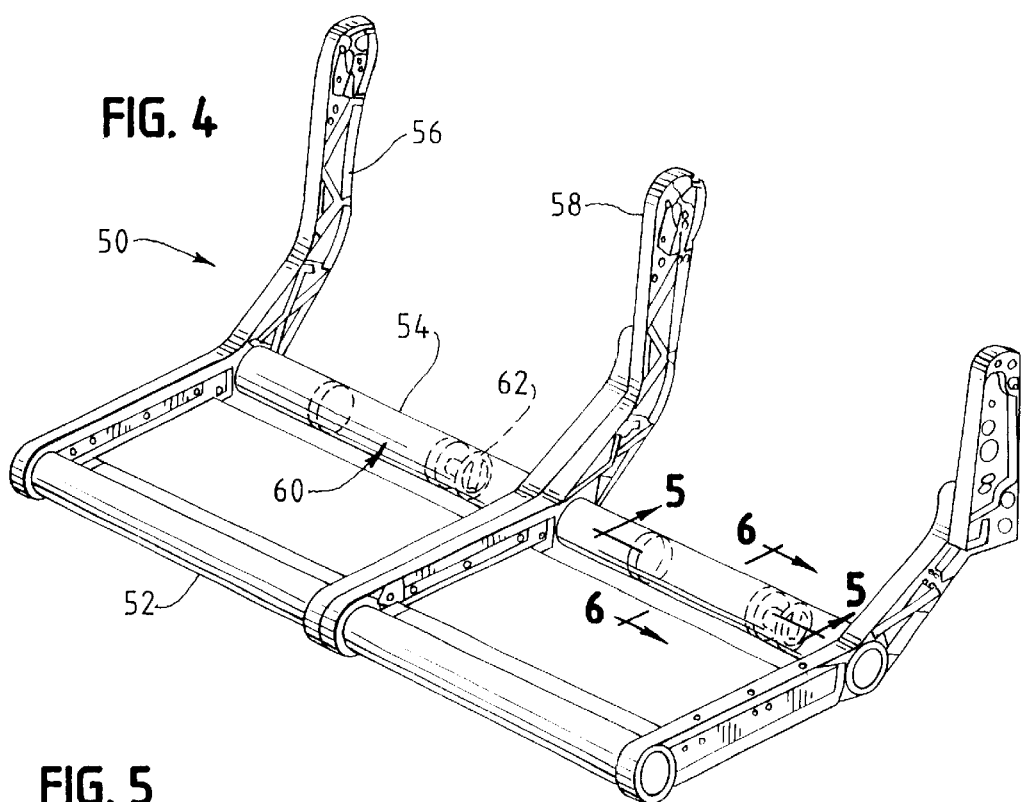
FIG. 4 is a general schematic of an aircraft seat structure incorporating an integral seat tube and gas generator device in accordance with an embodiment of the present invention.

Referring now to FIG. 4, a modified aircraft seat assembly 50 having a front hollow tube 52 and an integrated rear seat tube and pressurized gas (or gas generator) vessel 54 connected between two side structures 56 and 58 is shown. According to a preferred embodiment of the present invention, the integrated rear tube and gas (or gas generator) vessel 54 of the seat structure 50 contains pressurized gas 60. The integrated rear tube and gas vessel 54 includes a header section 62 incorporating an ignition system, gas flow control device, and gas release device.

Figure 5:
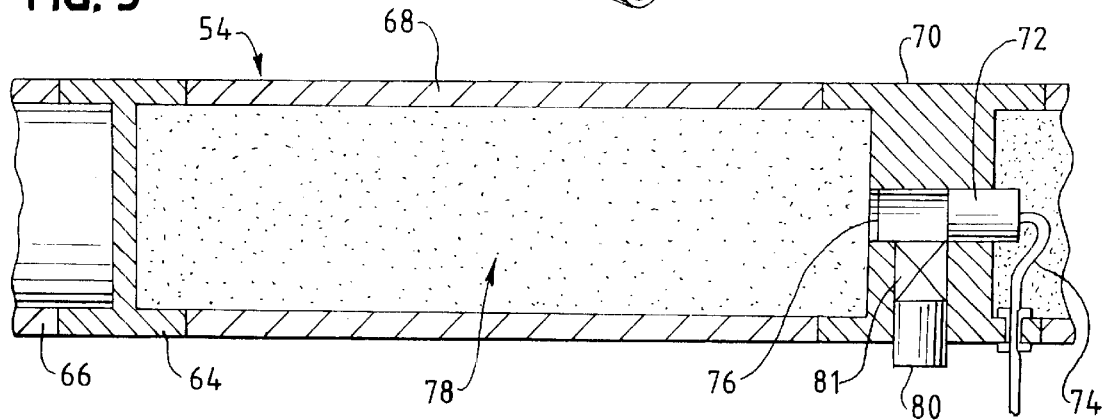
FIG. 5 is a cross-sectional view of a seat tube from an aircraft seat structure incorporating an integral seat tube and gas pressure vessel in accordance with an embodiment of the present invention.
Figure 6:
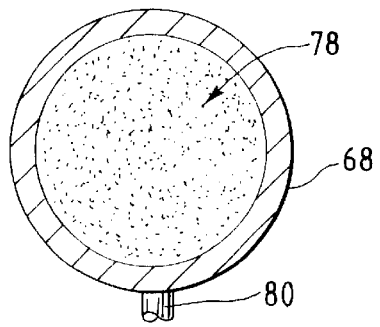
FIG. 6 is a cross-sectional view of a seat tube from an aircraft seat structure incorporating an integral seat tube and gas pressure vessel in accordance with an embodiment of the present invention.

FIGS. 5 and 6 each show a cross-section of the integrated rear tube and gas vessel 54, as shown in FIG. 3, in greater detail. Within the integrated rear tube and gas vessel 54 is an integrated end member 64 that connects the aircraft seat tube structure 66 and the pressure vessel wall 68. The integrated end member 64 is connected to the pressure vessel wall 68 through a metallurgical attachment, such as a friction weld. Additionally, end member 64 and pressure vessel wall 68 can be fabricated integrally, then attached to aircraft seat structure 66. The pressure vessel wall 68 must be configured to withstand greater load stresses than the aircraft seat tube structure 66, so, unlike the embodiment shown in FIGS. 1–3, the embodiment shown in FIGS. 4–6 requires a specially designed aircraft seat structure 50.

A integrated header 70 is connected to the pressure vessel wall 68 at the opposite end from the integrated end member 64. An ignition device 72 contained within the integrated header 70. The ignition device 72 is connected to an ignition system (not shown) via conductor 74. Also connected to the integrated header 70 is a pressure membrane 76 that holds pressurized gas within the pressurized area 78 defined by the pressure vessel wall 68, the integrated end member 64, and the integrated header 70. Contained within the integrated header 70 is a gas flow control device 81 and a gas exit port 80 The pressure membrane 76 is located between the pressurized area 78 and the gas exit port 80. When the ignition device 72 is triggered by the ignition system, the pressure membrane 76 is ruptured, allowing gas from the pressurized area 78 to travel in a controlled manner through the gas flow control device 81 and the gas exit port 80 to the airbag (not shown) via a gas conducting tube and inflate the airbag. For a more detailed description of the operation and construction of the ignition device 72, the ignition system, and the airbag, please refer to U.S. Pat. No. 5,984,350, as referenced above.

In an alternate embodiment, a hybrid system containing compressed gas and solid propellant is utilized to inflate the airbag rather than a pressurized gas alone, as is further described below with respect to FIGS. 4–6. The types of hybrid systems that can be used in this embodiment are well known in the art. In this alternate embodiment, a hybrid system is contained within the pressurized area 78. The ignition device 72 ignites a small pyrotechnic charge which serves the dual purposes of rupturing the pressure membrane 76 and heating the gas mixture contained in the pressurized area 78. As the gas mixture is heated, it is transported in a controlled manner through the gas flow control device 81 and the gas exit port 80 to the airbag (not shown) via a gas conducting tube to inflate the airbag.

It is to be understood that a wide range of changes and modifications to the embodiments described above will be apparent to those skilled in the art, and these changes and modifications are contemplated herein. It is, therefore, intended that the foregoing detailed description be regarded as illustrative rather than limiting, and that it be understood that it is the following claims, including all equivalents, that are intended to define the spirit and scope of the invention.

We claim:

1. An aircraft passenger seat comprising:
   a plurality of pre-shaped structural members interconnected to define a passenger seat base frame, at least one of the structural members defining an interior volume; and including:

(i) a pressure vessel wall;
(ii) a seat tube integrated end member coupled to the pressure vessel wall;
(iii) an aircraft seat tube structure coupled to the seat tube integrated end member; and
(iv) a seat tube integrated header coupled to the pressure vessel wall, wherein a pressurized area is defined by the pressure vessel wall, the seat tube integrated end member, and the seat tube integrated header; and a source of expansible gas including a quantity of pressurized gas and an associated ignition device that releases the pressurized gas when activated.

2. An aircraft passenger seat comprising:
a plurality of pre-shaped structural members interconnected to define a passenger seat base frame, at least one of the structural members defining an interior volume;
a source of expansible gas comprising a quantity of pressurized gas and an associated ignition device that releases the pressurized gas when activated;
a structural member that contains the source of expansible gas, which comprises:
(i) a pressure vessel wall;
(ii) a seat tube integrated end member coupled to the pressure vessel wall;
(iii) an aircraft seat tube structure coupled to the seat tube integrated end member; and
(iv) a seat tube integrated header coupled to the pressure vessel wall, wherein a pressurized area is defined by the pressure vessel wall, the seat tube integrated end member, and the seat tube integrated header, the seat tube, the seat tube integrated header containing the ignition device, a pressure membrane, a gas flow control device, and a gas exit port.

3. An aircraft passenger seat comprising:
a plurality of pre-shaped structural members interconnected to define a passenger seat base frame;
a source of expansible gas made of a mixture of compressed gas, solid fuel and an associated ignition device disposed within one of the structural members deferring a pressure vessel, wherein the structural member containing the mixture includes:
(i) a pressure vessel wall;
(ii) a seat tube integrated end member coupled to the pressure vessel wall;
(iii) an aircraft seat tube structure coupled to the seat tube integrated end member; and
(iv) a seat tube integrated header coupled to the pressure vessel wall, wherein a pressurized area is defined by the pressure vessel wall, the seat tube integrated end member and the seat tube integrated header.

4. An aircraft passenger seat comprising:
a seat frame structure including at least one hollow structural element;
a supply of pressurized gas for inflating a passenger airbag when a sudden declaration of the aircraft passenger seat occurs;
means for positioning the supply of pressurized gas within the hollow structural element, which means comprises:
(i) a pressure vessel wall;
(ii) a seat tube integrated end member coupled to the pressure vessel wall and to the hollow structural element; and
(iii) a seat tube integrated header coupled to the pressure vessel wall and to the hollow structural element.

5. An aircraft passenger seat comprising:
a seat frame structure including at least one hollow structural element;
a supply of compressed gas mixture and solid fuel for generating gas to inflate a passenger airbag when sudden deceleration of the aircraft passenger seat occurs; and
means for positioning the supply of compressed gas mixture and solid fuel within the hollow structural element which element further comprises:
(i) a pressure vessel wall;
(ii) a seat tube integrated end member coupled to the pressure vessel wall and to the hollow structural element; and
(iii) a seat tube integrated header coupled to the pressure vessel wall and to the hollow structural element.

6. An aircraft passenger seat comprising:
a plurality of pre-shaped structural members interconnected to define a passenger seat base frame, at least one of the structural members defining an interior volume; and
a source of expansible gas operatively contained within the interior volume to inflate a passenger airbag when activated, wherein:
the source of expansible gas is a quantity of pressurized gas and an associated ignition device that releases the pressurized gas when activated; and
the structural member defining an interior volume directly contains the source of expansible gas within the interior volume, the structural member further comprising:
a pressure vessel wall;
a seat tube integrated end member coupled to the pressure vessel wall;
an aircraft seat tube structure coupled to the seat tube integrated end member; and
a seat tube integrated header coupled to the pressure vessel wall;
wherein a pressurized area is defined by the pressure vessel wall, the seat tube integrated end member, and the seat tube integrated header.

7. The aircraft passenger seat as claimed in claim 6, wherein the seat tube integrated header contains the ignition device, a pressure membrane, a gas flow control device, and a gas exit port.

8. An aircraft passenger seat comprising:
a plurality of pre-shaped structural members interconnected to define a passenger seat base frame, at least one of the structural members defining an interior volume; and
a source of expansible gas operatively contained within the interior volume to inflate a passenger airbag when activated, wherein:
the source of expansible gas is a combined quantity of compressed gas mixture and solid fuel and an associated ignition device that ignites the solid fuel when activated, which then heats and releases the gas mixture; and
the structural member defining an interior volume directly contains the source of expansible gas within the interior volume, the structural member further comprising
a pressure vessel wall;
a seat tube integrated end member coupled to the pressure vessel wall;
an aircraft seat tube structure coupled to the seat tube integrated end member; and a seat tube integrated header coupled to the pressure vessel wall;

wherein a pressurized area is defined by the pressure vessel wall, the seat tube integrated end member, and the seat tube integrated header.

9. The aircraft passenger seat as claimed in claim 8, wherein the seat tube integrated header contains the ignition device, a pressure membrane, a gas flow control device, and a gas exit port.

10. An aircraft passenger seat comprising:

a seat frame structure including at least one hollow structural element;

a supply of pressurized gas for inflating a passenger airbag when a sudden deceleration of the aircraft passenger seat occurs; and means for positioning the supply of pressurized gas within the hollow structural element, wherein the means for positioning the supply of pressurized gas within the hollow structural element further comprises:

a pressure vessel wall;

a seat tube integrated end member coupled to the pressure vessel wall and to the hollow structural element; and a seat tube integrated header coupled to the pressure vessel wall and to the hollow structural element.

11. An aircraft passenger seat comprising:

a seat frame structure including at least one hollow structural element;

a supply of compressed gas mixture and solid fuel for generating gas to inflate a passenger airbag when a sudden deceleration of the aircraft passenger seat occurs; and means for positioning the supply of compressed gas mixture and solid fuel within the hollow structural element, wherein the means for positioning the supply of compressed gas mixture and solid fuel within the hollow structural element further comprises:

a pressure vessel wall;

a seat tube integrated end member coupled to the pressure vessel wall and to the hollow structural element; and a seat tube integrated header coupled to the pressure vessel wall and to the hollow structural element.

\* \* \* \* \*